Sept. 23, 1969  R. R. MYERS ET AL  3,468,106
AQUATIC WEED HARVESTER
Filed Sept. 8, 1966  2 Sheets-Sheet 1
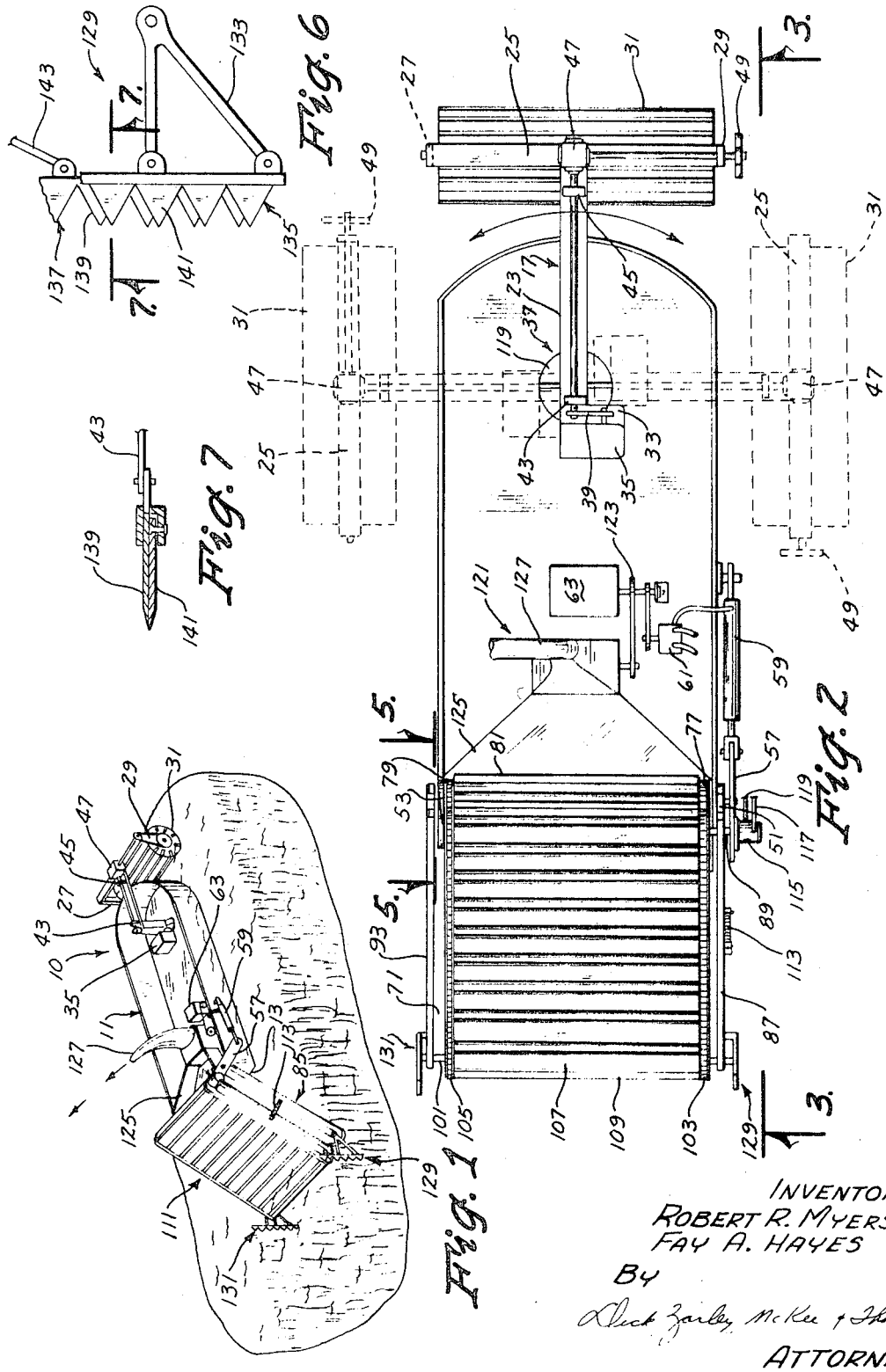
INVENTORS
ROBERT R. MYERS
FAY A. HAYES
BY
ATTORNEYS Sept. 23, 1969   R. R. MYERS ET AL   3,468,106
AQUATIC WEED HARVESTER
Filed Sept. 8, 1966   2 Sheets-Sheet 2
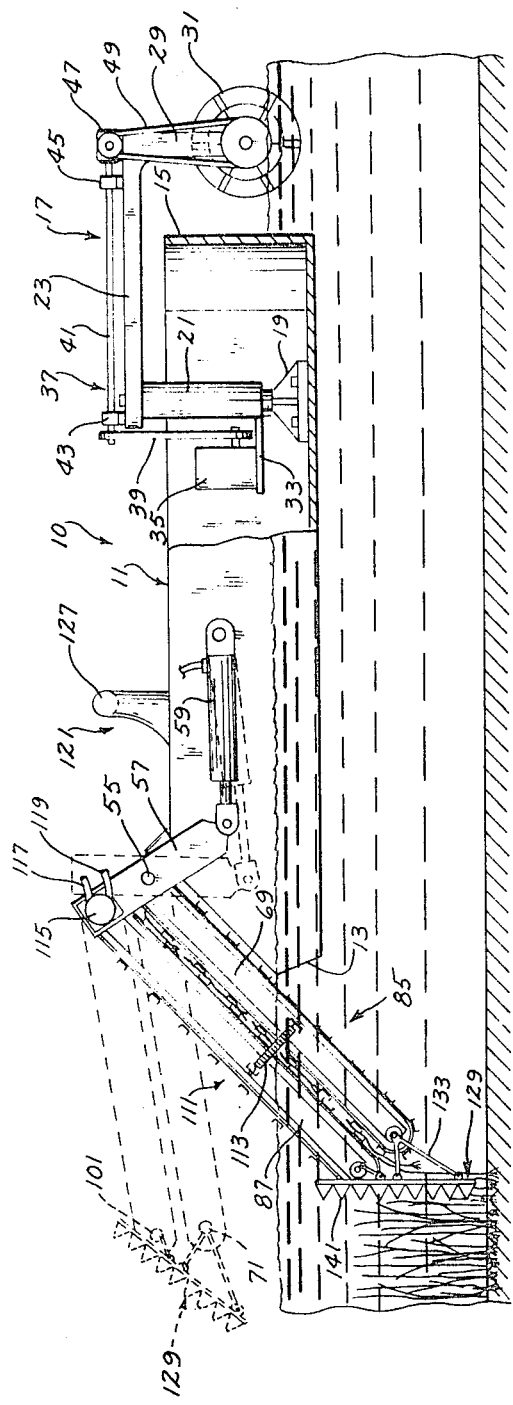
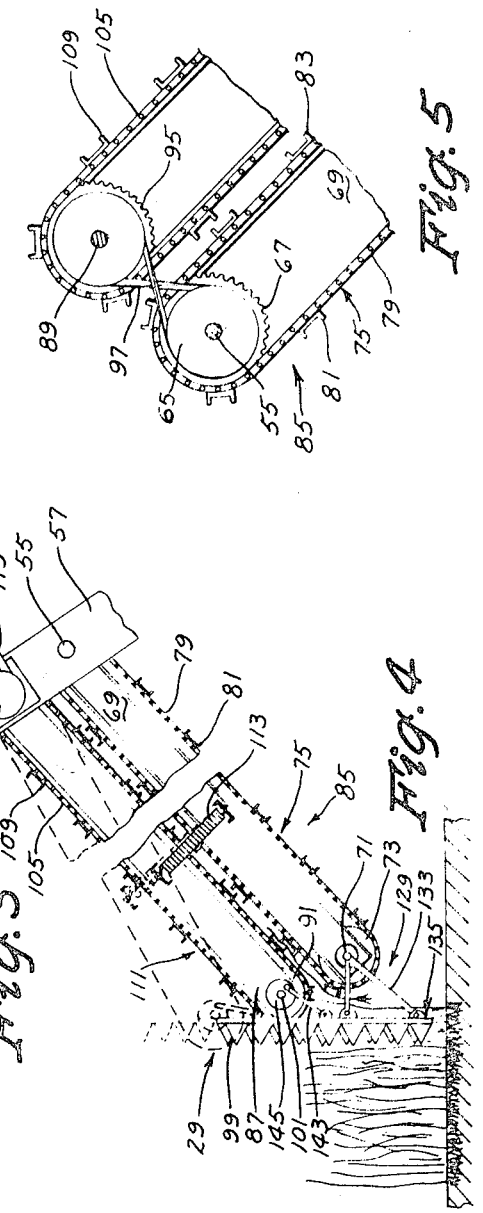
INVENTORS
ROBERT R. MYERS
FAY A. HAYES
BY
ATTORNEYS United States Patent Office 3,468,106
Patented Sept. 23, 1969

3,468,106
AQUATIC WEED HARVESTER
Robert R. Myers, 904 NE. 2nd St. and Fay A. Hayes, 144
NW. 7th St., both of Boca Raton, Fla. 33432
Filed Sept. 8, 1966, Ser. No. 578,071
Int. Cl. A01d 45/08
U.S. Cl. 56—9          5 Claims

ABSTRACT OF THE DISCLOSURE

An aquatic weed harvester comprising a boat means having a propulsion means at its rearward end and a weed picking means at its forward end. The weed picking means includes opposing conveyor means which are adjustably movable with respect to the boat means and are movable with respect to each other. The weeds are grasped between the opposing conveyors and are pulled from the area being harvested.

---

The control of aquatic weeds in canals or inland waterways is extremely difficult, for example, the canals in Florida are becoming choked mainly due to a water hyacinth growing therein. There are approximately fifty species of other water plants which need to be kept un-aquatic weed harvester which pulls the entire weed from world, especially inland lakes, waterways, etc. These aquatic weeds have been somewhat controlled through the use of herbicides and the like but these herbicides are not completely effective and present serious contamination problems.

Therefore, it is a principal object of this invention to provide an aquatic weed harvester.

A further object of this invention is to provide an aquatic weed harvester having a pivotally mounted paddle wheel means at the rearward end thereof.

A further object of this invention is to provide an aquatic weed harvester having a weed cutting means at the forward end thereof.

A further object of this invention is to provide an der control also, not only in Florida, but throughout the the water.

A further object of this invention is to provide an aquatic weed harvester which can be used to harvest surface weeds or weeds beneath the water.

A further object of this invention to to provide an aquatic weed harvester having a double roll header means thereon.

A further object of this invention is to provide an aquatic weed harvester which has a weed conditioning means thereon which chops the harvested weeds to a fineness to prevent the growth.

A further object of this invention is to provide an aquatic weed harvester having a blower means thereon which is adapted to blow the harvested weeds to the shore or other suitable area.

A further object of this invention is to provide an aquatic weed harvester which is self-propelled.

A further object of this invention is to provide an aquatic weed harvester which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIGURE 1 is a top perspective view of the aquatic weed harvester,

FIGURE 2 is a top view of the device, the broken lines indicating the possible movement of the paddle wheel drive means;

FIGURE 3 is a side view of the device with portions thereof cut away to more fully illustrate the invention, the broken lines indicating the position to which the header rolls may be pivoted;

FIGURE 4 is a side view of the double roll head means;

FIGURE 5 is a sectional view as would be seen on line 5—5 of FIG. 2, at an enlarged scale;

FIG. 6 is a fragmentary side view of the cutting means; and

FIG. 7 is a sectional view as would be seen on line 7—7 of FIG. 6, at an enlarged scale.

The aquatic weed harvester of this invention is generally indicated by the reference numeral 10. A boat means 11 having a forward end 13 and a rearward end 15 is designed to support the weed harvester apparatus. Boat 11 is propelled by a paddle wheel means 17 which is pivotally mounted to the rearward end of the boat 11 as illustrated in the drawings. A post 19 is secured to the bottom of the boat 11 as best seen in FIG. 3 and pivotally receives a cylinder 21 extending downwardly thereover. An arm member 23 extends rearwardly from the upper end of cylinder 21 and terminates in a transverse frame member 25. A pair of frame members 27 and 29 extend downwardly from the opposite ends of frame member 25 and have a paddle wheel 31 rotatably mounted in and extending therebetween. A motor support bracket 33 is secured to cylinder 21 at the lower end thereof by any convenient means and has a power means 35 mounted thereon. Paddle wheel 31 is caused to rotate by a drive assembly 37 including belt 39, rotatable shaft 41, bearings 43 and 45, gear box 47 and belt 49.

A pair of brackets 51 and 53 extend upwardly from boat 11 at the forward end thereof and have a shaft 55 rotatably extending therebetween. The numeral 57 designates an arm member having a hydraulic cylinder means 59 or other suitable power means pivotally secured at its lower end. The rearward end of hydraulic cylinder means 59 is pivotally secured to boat 11 as best seen in FIG. 2. Hydraulic cylinder means 59 is operatively connected to a hydraulic control means 61 which is operatively connected to a power means 63. A roll 65 is mounted on shaft 55 and has a sprocket means operatively mounted at each end thereof such as sprocket 67 seen in FIG. 5. A pair of channel-shaped frame members such as frame member 69 have their upper ends mounted on shaft 55 and extend downwardly and forwardly therefrom outwardly of the sprocket means 67. The frame member 69 viewed in FIG. 4 is rigidly secured to arm member 57 for movement therewith. Thus, the activation of hydraulic cylinder means 59 causes arm member to pivot about shaft 55 and causes frame members 69 to be raised or lowered accordingly. A shaft 71 extends between the lower ends of the frame members 69 and has a roll 73 rotatably mounted thereon. Roll 73 is provided with sprockets 75 at each of its ends which are identical to sprocket 67. A conveyor means 75 is mounted on rolls 65 and 73 and extends therebetween and includes spaced apart chain members 77 and 79, an endless conveyor belt 81 extending between chains 77 and 79 and being secured thereto, and a plurality of channel-shaped cleat members 83 secured to belt 81 and extending between chains 77 and 79. For purposes of description, conveyor means 75 and its associated structure will be described as comprising a lower head assembly 85.

A channel-shaped frame member 87 is pivotally secured at its upper end to arm member 57 and extends downwardly and forwardly therefrom as best illustrated in FIG. 4. A shaft 89 rotatably extends through the upper end of frame members 87 and through arm member 57 and supports a roll member 91 thereon. A channel-shaped frame member 93 is provided at the other end of roll 91 and extends downwardly and forwardly therefrom and the other end of shaft 89 is rotatably mounted therein. Roll 91 is provided with sprockets at each end such as sprocket 95 seen in FIG. 5. One end of roll 91 is provided with a V-shaped pulley groove formed therein adapted to receive a belt 97 and one end of roll 65 is also provided with a V-shaped groove formed therein also adapted to receive belt 97. Belt 97 is mounted as clearly seen in FIG. 5. A roll 99 having a shaft 101 extending therethrough is mounted between the lower ends of frame members 87 and 93 and is provided with a pair of sprockets at its opposite ends. A pair of spaced apart chain members 103 and 105 extend around the sprockets at each end of roll 99 and the sprockets at the opposite ends of roll 91 and have a conveyor belt 107 secured thereto and extending therebetween which is provided with a plurality of U-shaped cleats 109 secured thereto and extending therefrom as seen in FIG. 5. For purposes of description, conveyor belt 107 and its associated structure will be described as comprising an upper head assembly 111. An adjustable spring means 113 is secured to frame members 69 and 87 and extends therebetween as seen in FIG. 4 and is adapted to yieldably resist the pivotal movement of head assemblies 85 and 111 with respect to each other.

A hydraulic motor 115 is operatively secured to one end of shaft 89 and is adapted to cause the rotation thereof. Hydraulic motor 115 is operatively connected to control means 61 by means of conduits 117 and 119. A conventional shredding apparatus 121 is provided within the bolt 11 and is powered by power means 63 by means of belt 123. A shroud or chute 125 extends from shredder apparatus 121 to a point adjacent the rearward ends of the upper and lower header assemblies as seen in FIG. 1. Shredder apparatus 121 is adapted to shred or chop the aquatic weeds supplied thereto to at least to particles in the size of 7/32 inches in length to prevent the plant particles from regrowing. Shredder apparatus 121 is provided with an internal blower means having a blower chute 127 extending therefrom, the blower means being adapted to blow the chopped plants to a location remote from the boat.

A weed cutting means such as cutting means 129 and 131 is preferably mounted at the forward end of the head rolls as seen in FIG. 1. Inasmuch as cutting means 129 and 131 are identical, only cutting means 129 will be described. A yoke support 133 is secured to shaft 71 and has a sickle blade assembly 135 secured thereto. A movable sickle blade assembly 137 is slidably mounted at one side of assembly 135 and has a plurality of teeth 139 adapted to slidably move closely adjacent teeth 141 of assembly 135. A pitman 143 is pivotally secured at one end to assembly 137 and is pivotally secured at its other end to an eccentric 145 which is mounted on shaft 101. There is no rigid connection between the upper header assembly and the cutting means 129 to permit the forward ends of the header roll assemblies to slightly separate to accommodate the incoming weeds.

The harvester is operated in the following manner. The boat 11 is placed in the water to be cleared of the aquatic weeds whether it be a canal, waterway, inland lake, etc. The boat 11 is propelled by means of the paddle wheel assembly 17 which is powered by a power means 35. The activation of power means 35 causes the paddle wheel 31 to be rotated either forwardly or rearwardly to propel the boat forwardly or rearwardly. The boat is maneuvered by simply causing the paddle wheel means 17 to be pivoted about post 19 as illustrated by the broken lines in FIG. 2. It can be seen in FIG. 2 that the paddle wheel assembly can be rotated approximately 180 degrees to provide the utmost in maneuverability for the boat.

The power means 63 not only operates the shredder assembly 121 but also operates the control means 61 which operates hydraulic cylinder 59 and hydraulic motor 115. The activation of hydraulic motor 115 causes the conveyor belt on the lower header assembly to be rotated in a clockwise direction as viewed in FIG. 3 and causes the conveyor belt on the upper head assembly to be rotated in a counterclockwise direction as viewed in FIG. 3. As the boat 11 is propelled forwardly, the aquatic weeds are engaged by the rotating header assemblies which causes the upper ends of the weeds to be pulled between the opposing conveyor belts due to the engagement of the cleats thereon. The opposing conveyor belts exert sufficient frictional engagement to cause the weeds including the roots to be pulled from the bottom of the body of water. It is important that the roots be removed to prevent regrowth of the weeds. Spring means 113 yieldably resists the pivotal movement of the upper and lower head assemblies with respect to each other but permits the slight pivotal movement thereof to permit the upper and lower header assemblies to accommodate large bunches of incoming weeds if necessary. Spring means 113 also aids in maintaining the frictional engagement of the cleat members on the respective conveyor belts with the incoming weeds.

The activation of hydraulic cylinder means 59 causes the header assemblies to be pivoted as illustrated in FIG. 3. The pivotal movement of the header assemblies permits the harvesting of aquatic weeds from the bottom of the body of water or at the surface thereof and also permits the header assemblies to be completely rotated upwardly to a transport position. The cutting means 129 and 131 are activated by the rotation of shaft 101 as previously described and separate the plants or weeds being removed from the adjacent plants. The cutting means is important because the aquatic weeds are interwoven and must be separated to satisfactorily remove the same.

The aquatic weeds are deposited into the chute means 125 by the conveyor belts and caused to enter shredding assembly 121 wherein the weeds are chopped to a degree to prevent the regrowth thereof. The chopped weeds may be blown to a suitable receptacle or may be blown to the shore or deposited on the water.

Thus it can be seen that a unique device has been provided for the harvesting of aquatic weeds. The device efficiently and economically harvests aquatic weeds in such a manner which prevents any regrowth thereof. The aquatic weed harvester described herein is extremely versatile and maneuverable due to the propulsion means and the harvesting means thereon.

Thus it can be seen that the device accomplishes at least all of its stated objectives.

Some changes may be made in the construction and arrangement of our aquatic weed harvester without departing from the real spirit and purpose of our invention.

We claim:
1. In an aquatic weed harvester,
a boat means having rearward and forward ends,
a propulsion means at the rearward end of said boat means,
and a weed picking means operably mounted at the forward end of said boat means,
an arm means pivotally secured intermediate its length to said boat means,
a lower conveyor means secured at its upper end to said arm means and extending forwardly therefrom,
an upper conveyor means above said lower conveyor means and having its upper end pivotally secured to said arm means,
means connected to said arm means adapted to pivot it with respect to said boat means thereby causing said lower and upper conveyor means to be pivoted with respect to said boat means.

2. The harvester of claim 1 wherein a hydraulic motor is operatively connected to said upper and lower conveyor means for powering the same.

3. The harvester of claim 1 wherein an adjustable spring means is connected to said lower and upper conveyor means and extends therebetween and is adapted to resist the pivotal movement of said upper conveyor means in one direction with respect to said lower conveyor means.

4. In an aquatic weed harvester,
a boat means having rearward and forward ends,
a propulsion means at the rearward end of said boat means,
a weed picking means operatively mounted at the forward end of said boat means and having inner and outer ends with respect to said boat means, said weed picking means including a lower conveyor means operatively secured at its upper end to said boat means and an upper conveyor means operatively pivotally secured to said boat means and being positioned over said lower conveyor means, said upper conveyor means being pivotally movable with respect to said lower conveyor means so that the outer end of said upper conveyor means can move away from and towards the outer end of said lower conveyor means,
and means connected to said lower conveyor means for pivotally moving the same about a horizontal axis with respect to said boat means whereby the outer ends of said lower and upper conveyor means may be raised and lowered with respect to said boat means,
said upper and lower conveyor means having means thereon adapted to grasp aquatic weeds to pull substantially the entire plants from the area being harvested.

5. The harvester of claim 4 wherein the outer end of said upper conveyor means is positioned above and outwardly of the outer end of said lower conveyor means.

References Cited

UNITED STATES PATENTS

| | | | |
|---|---|---|---|
| 545,950 | 9/1895 | Evans | 115—50 |
| 845,937 | 3/1907 | Fahrney | 115—50 |
| 1,028,671 | 6/1912 | Brooks | 56—9 |
| 1,269,515 | 6/1918 | Wyckoff | 56—9 |
| 1,481,177 | 1/1924 | Bayard et al. | 56—9 |
| 1,713,739 | 5/1929 | Callahan | 56—9 |
| 1,795,003 | 3/1931 | Allen | 56—9 |
| 2,181,863 | 12/1939 | Bell | 56—9 |
| 2,711,708 | 6/1955 | Thornberg | 115—50 |
| 3,347,029 | 10/1967 | Grinwald | 56—9 |
| 3,387,611 | 6/1968 | Looker | 56—327 X |

FOREIGN PATENTS 428,447  12/1947  Italy.

ANTONIO F. GUIDA, Primary Examiner

PASQUALE A. RAZZANO, Assistant Examiner

U.S. Cl. X.R.

115—50